(12) United States Patent
Kasiviswanathan et al.

(10) Patent No.: US 11,734,567 B2
(45) Date of Patent: Aug. 22, 2023

(54) METHOD AND SYSTEM FOR REDUCING DEEP NEURAL NETWORK ARCHITECTURES

(71) Applicant: Samsung Electronics Co., Ltd., Suwon-si (KR)

(72) Inventors: Shiva Prasad Kasiviswanathan, Dublin, CA (US); Nina Narodytska, Mountain View, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1084 days.

(21) Appl. No.: 15/895,683

(22) Filed: Feb. 13, 2018

(65) Prior Publication Data

US 2019/0251440 A1  Aug. 15, 2019

(51) Int. Cl.
*G06N 3/082*  (2023.01)
*G06N 3/045*  (2023.01)

(52) U.S. Cl.
CPC ............ *G06N 3/082* (2013.01); *G06N 3/045* (2023.01)

(58) Field of Classification Search
None
See application file for complete search history.

(56) References Cited

U.S. PATENT DOCUMENTS

| | | |
|---|---|---|
| 6,167,390 A | 12/2000 | Brady et al. |
| 7,849,032 B1 | 12/2010 | Campos et al. |
| 9,633,306 B2 | 4/2017 | Liu et al. |
| 10,438,131 B1 * | 10/2019 | Pennington ............ G06N 20/10 |
| 2016/0162779 A1 | 6/2016 | Marcus et al. |
| 2017/0154262 A1 * | 6/2017 | Sussillo ................ G06N 3/082 |
| 2017/0262898 A1 | 9/2017 | Hersch et al. |
| 2018/0012107 A1 | 1/2018 | Xu et al. |
| 2018/0039879 A1 * | 2/2018 | Shaji ...................... G06K 9/036 |
| 2018/0060719 A1 * | 3/2018 | Kisilev ................ G06N 3/0454 |
| 2018/0157916 A1 * | 6/2018 | Doumbouya ...... G06K 9/00771 |
| 2019/0073560 A1 * | 3/2019 | Matei ...................... G06N 3/08 |
| 2020/0167654 A1 * | 5/2020 | Guo ...................... G06N 5/003 |
| 2020/0234130 A1 * | 7/2020 | Yan ...................... G06N 3/0454 |
| 2021/0224586 A1 * | 7/2021 | Wang .................... G06F 18/213 |

FOREIGN PATENT DOCUMENTS

| | | |
|---|---|---|
| JP | 2005-267407 A | 9/2005 |
| KR | 10-0424724 81 | 3/2004 |
| KR | 10-2016-0143505 | 12/2016 |

OTHER PUBLICATIONS

Tai et al., Convolutional neural networks with low-rank regularization, Nov. 19, 2015, arXiv (Year: 2015).*

(Continued)

*Primary Examiner* — James D. Rutten
(74) *Attorney, Agent, or Firm* — Sherman IP LLP; Kenneth L. Sherman; Steven Laut

(57) ABSTRACT

A method includes deploying a neural network (NN) model on an electronic device. The NN model is generated by training a first NN architecture on a first dataset. A first function defines a first layer of the first NN architecture. The first function is constructed based on approximating a second function applied by a second layer of a second NN architecture. Retraining of the NN model is enabled on the electronic device using a second data set.

20 Claims, 8 Drawing Sheets

(56) References Cited

OTHER PUBLICATIONS

Daniely et al., Sketching and Neural Networks, Apr. 21, 2016, arXiv (Year: 2016).*
Liu et al., Learning Efficient Convolutional Networks through Network Slimming, 2017, Proceedings of the IEEE International Conference on Computer Vision (ICCV), pp. 2736-2744 (Year: 2017).*
Tai, C., Xiao, T., Zhang, Y. and Wang, X., 2015. Convolutional neural networks with low-rank regularization. arXiv preprint arXiv:1511.06067. (Year: 2015).*
Denil, M., Shakibi, B., Dinh, L., Ranzato, M.A. and De Freitas, N., 2013. Predicting parameters in deep learning. arXiv preprint arXiv:1306.0543. (Year: 2013).*
Wang, Y., Tung, H. Y., Smola, A. J., & Anandkumar, A. (2015). Fast and guaranteed tensor decomposition via sketching. Advances in neural information processing systems, 28. (Year: 2015).*
Ravi, "ProjectionNet: Learning Efficient On-Device Deep Networks Using Neural Projections" 2017, arXiv, accessed from <https://arxiv.org/abs/1708.00630> (Year: 2017).*
A. Tjandra, S. Sakti and S. Nakamura, "Compressing recurrent neural network with tensor train," 2017 International Joint Conference on Neural Networks (IJCNN), 2017, pp. 4451-4458, doi: 10.1109/IJCNN.2017.7966420. (Year: 2017).*
Kasiviswanathan, S.P. et al., "Deep Natural Network Approximation using Tensor Sketching", arXuv.org [online] Oct. 21, 2017, pp. 1-19, United States, downloaded from: http://arxiv.org/abs/1710.07850.
International Search Report and Written Opinion dated Nov. 13, 2018 for International Application PCT/KR2018/005492 from Korean Intellectual Property Office, pp. 1-10, Republic of Korea.
Han, S. et al., "Learning both Weights and Connections for Efficient Neural Networks", Oct. 30, 2015, XP055396330, pp. 1-9, United States, downloaded from: https://arxiv.org/pdf/1506.02626.pdf.
Liu, Z. et al., "Learning Efficient Convolutional Networks through Network Slimming", Proceedings of the IEEE International Conference on Computer Vision, Oct. 22, 2017, pp. 2755-2763, United States, IEEE.
Extended European Search Report dated Nov. 13, 2020 for European Application No. 18906318.3 from European Patent Office. pp. 1-10, Munich, Germany.
European Examination Report dated Oct. 5, 2022 for European Application No. 18906318.3 from European Patent Office, pp. 1-7, The Netherlands.

* cited by examiner

800

810 — Deploying a Neural Network (NN) Model on an Electronic Device, the NN Model Being Generated by Training a First NN Architecture on a First Dataset, Wherein a First Function Defines a First Layer of the First NN Architecture, the First Function Being Constructed Based on Approximating a Second Function Applied by a Second Layer of a Second NN Architecture

820 — Enabling Retraining of the NN Model on the Electronic Device Using a Second Data Set

830 — Retraining the NN Model on the Electronic Device Using a Personalized Data Set

FIG. 8

METHOD AND SYSTEM FOR REDUCING DEEP NEURAL NETWORK ARCHITECTURES

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to neural network modeling and, in particular, to reducing neural network architectures.

BACKGROUND

Deep neural networks (NNs) have become ubiquitous in machine learning with applications, ranging from computer vision, to speech recognition, and natural language processing. Deep NNs define parameterized functions from inputs to outputs, as compositions of many layers of basic functions, both linear/affine transformations and nonlinear functions. The recent successes of convolutional neural networks (CNNs) for computer vision applications have, in part, been enabled by recent advances in scaling up these networks, leading to networks with millions of parameters and multiple convolutional layers and fully connected layers. As these networks keep growing in their number of parameters, reducing their storage and computational processing has become critical for meeting the requirements of practical applications. While it is possible to train and deploy these deep CNNs on modern clusters (cloud platforms), their storage, memory bandwidth, and computational requirements make them prohibitive for embedded mobile applications.

SUMMARY

One or more embodiments generally relate to reducing neural network architectures, data set training after reduction and on-device data retraining. In one embodiment, a method includes deploying a neural network (NN) model on an electronic device. The NN model is generated by training a first NN architecture on a first dataset. A first function defines a first layer of the first NN architecture. The first function is constructed based on approximating a second function applied by a second layer of a second NN architecture. Retraining of the NN model is enabled on the electronic device using a second data set.

In some embodiments, an electronic device includes a memory storing instructions. At least one processor executes the instructions including a process configured to deploy an NN model on the electronic device. The NN model is generated by training a first NN architecture on a first dataset. A first function defines a first layer of the first NN architecture. The first function is constructed based on approximating a second function applied by a second layer of a second NN architecture. The process is further configured to enable retraining of the NN model on the electronic device using a second data set.

In one or more embodiments, a non-transitory processor-readable medium that includes a program that when executed by a processor performing a method that includes deploying a neural network (NN) model on an electronic device. The NN model is generated by training a first NN architecture on a first dataset. A first function defines a first layer of the first NN architecture. The first function is constructed based on approximating a second function applied by a second layer of a second NN architecture. Retraining of the NN model is enabled on the electronic device using a second data set.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 8 shows a block diagram of a process for reducing neural network architectures, according to some embodiments.

DETAILED DESCRIPTION

Figure 1:
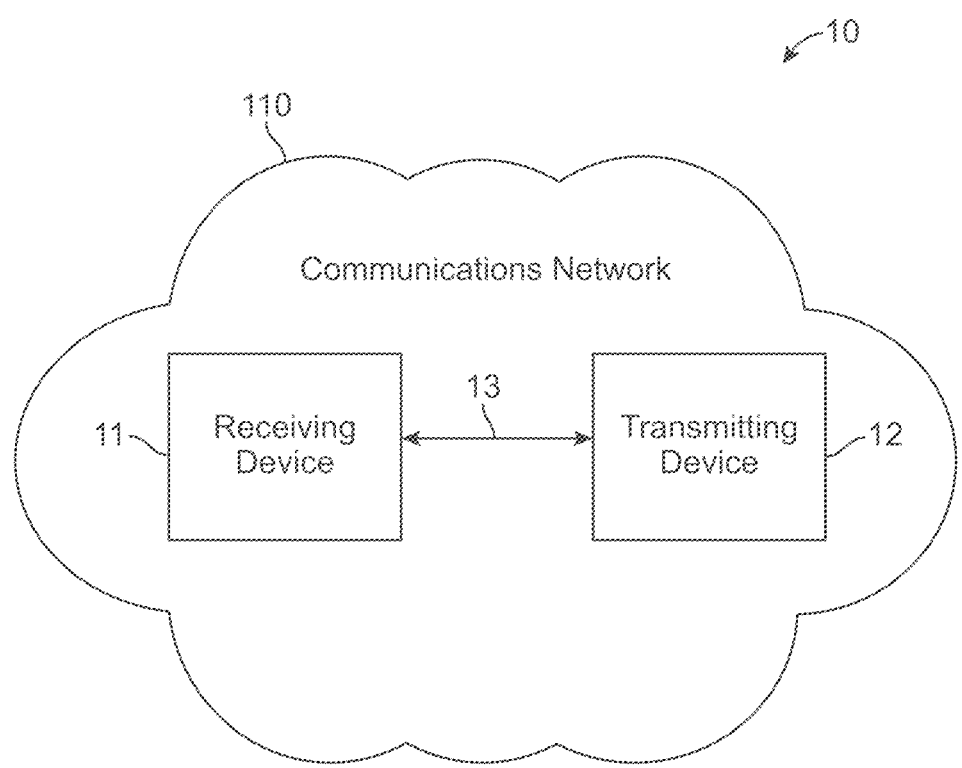
FIG. 1 shows a schematic view of a communications system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for reducing neural network architectures. Some embodiments include a method that includes deploying a neural network (NN) model on an electronic device. The NN model is generated by training a first NN architecture on a first dataset. A first function defines a first layer of the first NN architecture. The first function is constructed based on approximating a second function applied by a second layer of a second NN architecture. Retraining of the NN model is enabled on the electronic device using a second data set.

Deep NNs are powerful and popular learning models that achieve state-of-the-art pattern recognition performance on many computer vision, speech, and language processing tasks. Storage and memory requirements of deep NNs make it problematic to train or even deploy these large networks on mobile devices (e.g., smart phones, wearables, tablet computing devices, etc.). Some embodiments employ a framework for reducing the model sizes of deep NNs. For clarity, the terms "network" and "model" are distinguished herein as follows: network refers to network architecture (e.g., NN architecture) that describes the transformation applied on the input, whereas model refers to a trained network with fixed parameters obtained by training a network on some training dataset. In one or more embodiments, the "Training after Reduction" framework for reducing deep NN architectures is based on solving a network approximation problem which may be informally defined as follows: given a target network architecture NN, design a new smaller network architecture $\widehat{NN}$, which approximates the original (target) network architecture in its operations. Then the original NN may be replaced with the smaller NN for both training and subsequent deployment. One advantage of this approach is that it completely eliminates the need for ever realizing the original network, even during the initial training phase, making this approach more amenable to mobile environments.

One or more embodiments changes layers in deep NNs that substantially reduce the number of effective parameters. The resulting reduced NN is simple to train, and achieves performance that is comparable to the original NN even under substantial compression. Some embodiments have rigorous theoretical guarantees on quality of approximation on the performance achieved by the constructed reduced NN architecture to the performance achieved by the original NN architecture. Some embodiments may be used for different types of datasets from domains ranging from computer vision to speech, and varied network architectures. For example, with convolutional NNs, one or more embodiments may achieve up to 10× reduction in the number of parameters while maintaining the classification accuracy performance of the NN.

In conventional systems employing the "Reduction after Training" framework, since the model reduction happens as a post-processing (or in a recursive loop) on a trained NN, the reduction obtained via these techniques are intrinsically tied to a NN and dataset pair. In other words, the fact that a particular amount of reduction is possible for a model $NN_D$ (network NN trained on a dataset D), does not automatically transfer to a model $NN_{D'}$ (network NN trained on a dataset D'). In some embodiments employing a "Training after Reduction" framework, the reduction is agnostic to the dataset, and the reduction of the original NN is designed to have similar performance as the original network on a wide range of datasets. In some embodiments, since the original NN is never trained, the computational requirements for training are significantly lower than conventional systems.

In one or more embodiments, given two reduced models $\widehat{NN}_D$ (generated using some embodiments) and $\widehat{NN}_D$ (generated using conventional approaches), retraining $\widehat{NN}_D$ on a new dataset leads to significantly better performance than retraining $\widehat{NN}_D$ on the same dataset. This is because when model reduction occurs after training (as in the generation of $\widehat{NN}_D$) the reduced model over fits the dataset D, thereby losing the power to generalize to new data. This problem is avoided in one or more embodiments. With a training after reduction framework, the NN model can be re-trained repeatedly as new data arrives on a mobile electronic device (e.g., a smartphone, wearable, tablet computing device, etc.). But, in the conventional systems employing a reduction after training framework, this is not possible. Further, retraining is an essential feature that is necessary for personalizing deep neural models to individual users.

Some embodiments may be used with existing NN architecture, such as architectures for convolutional NNs, recurrent NNs, long/short term memory NNs, etc. The reduction of NNs and training after reduction is oblivious to the data set, meaning that the embodiments do not require any prior knowledge of the data set as input. One or more embodiments result in a substantial reduction in computing resources to the electronic device (e.g., electronic device 120, FIG. 2) such as computation time, storage space, and transmission bandwidth. Some embodiments are scalable and stable for real-world deployment, and allow efficient retraining (fine-tuning) of deep learning models entirely on a mobile device (without the need for communicating to the cloud or server).

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a) BLACKBERRY®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to mobile telephone devices, television systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., data and control messaging, e-mails, text messages, media messages), video communication, or combinations of these (e.g., video conferences).

Figure 2:
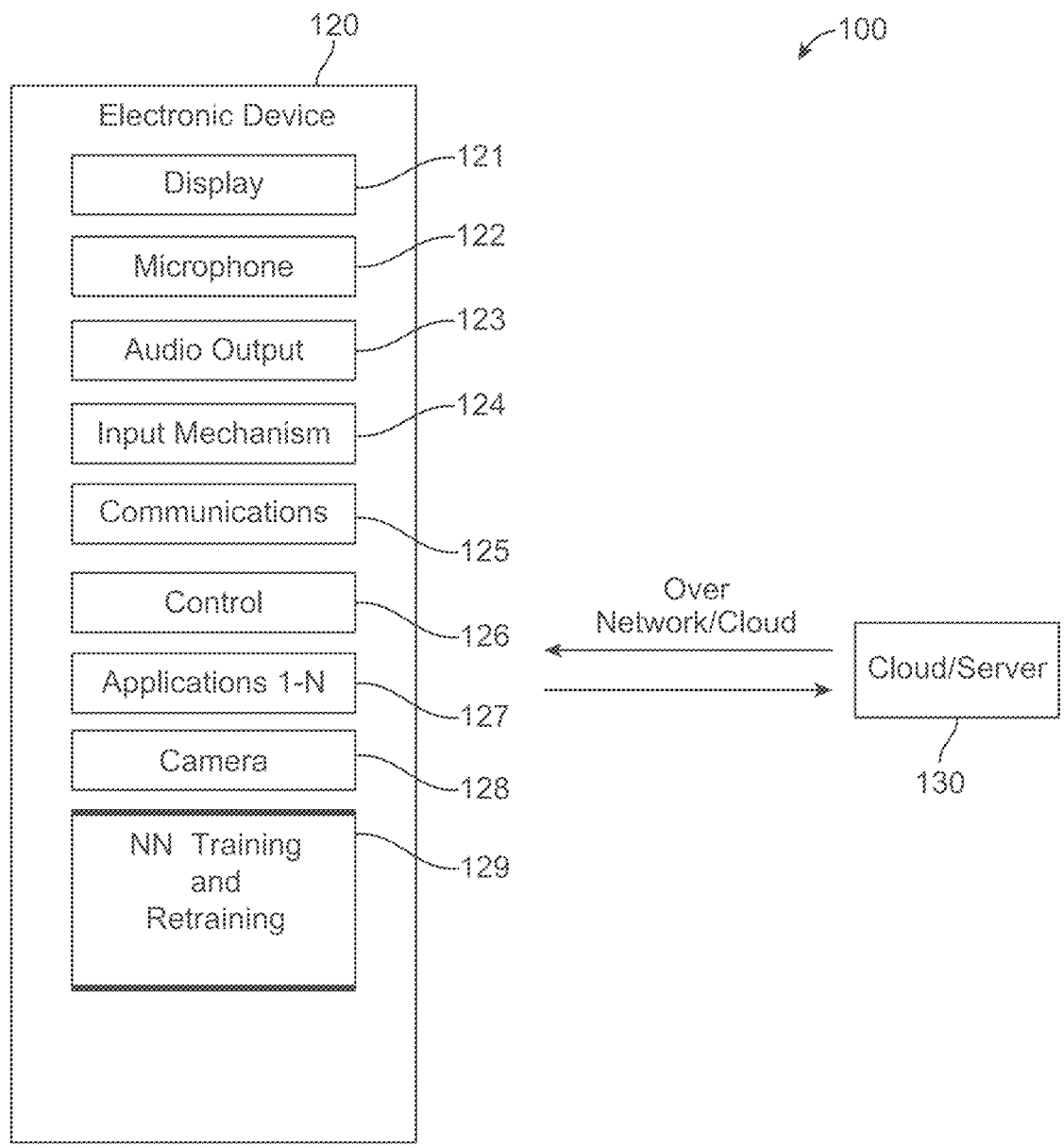
FIG. 2 shows a block diagram of architecture for a system including an electronic device that is capable of performing a neural network (NN) reduction, training and retraining, according to some embodiments.

FIG. 2 shows a block diagram of an architecture for a system 100 that is capable of performing at least one of reducing neural network architectures, data set training after reduction and on-device data retraining using an electronic device 120 (e.g., mobile telephone devices, television (TV) systems, cameras, camcorders, a device with audio video capabilities, tablets, pad devices, wearable devices, smart appliances, smart picture frames, smart lighting, etc.), a cloud or server 130, or a combination of the electronic device 120 and the cloud or server 130. Both the transmitting device 12 (FIG. 1) and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera 128, an NN training and retraining app 129 (for data set training after reduction and on-device data retraining, and optionally communicating with the communications circuitry 125 to obtain/provide information thereof with the cloud or server 130; and may include any of the processing for, but not limited to, the examples as described below), and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOW, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
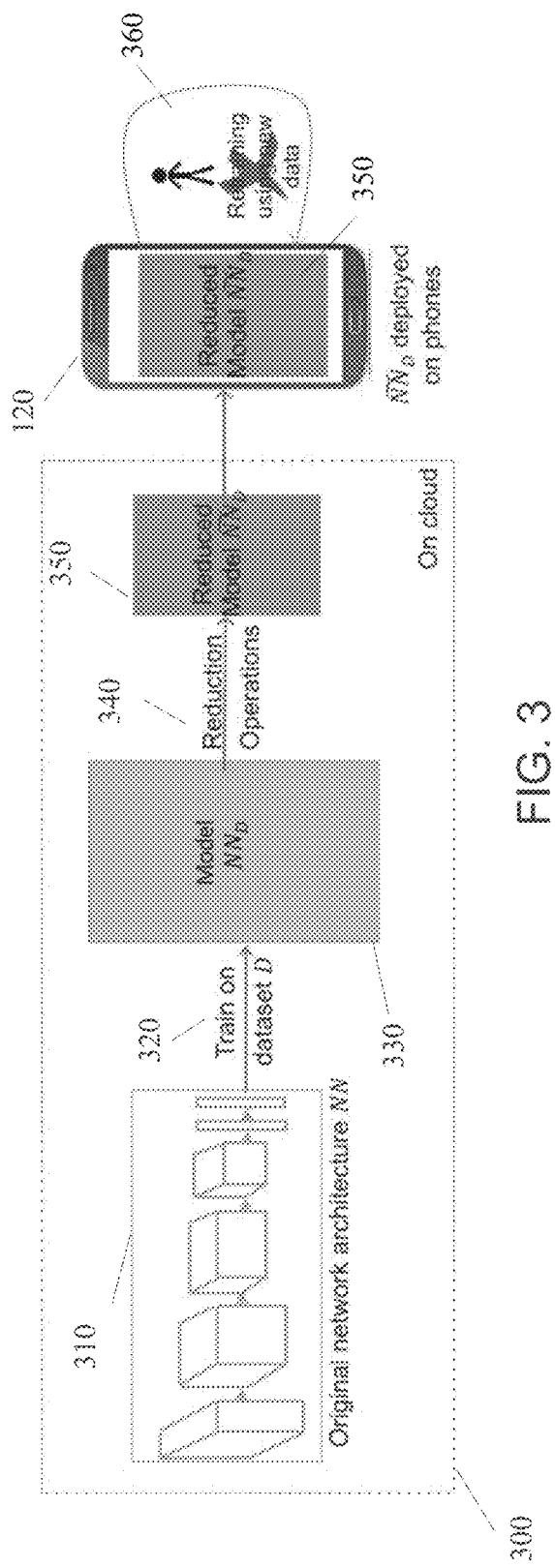
FIG. 3 shows an example of conventional NN model reduction.

FIG. 3 shows a high-level example 300 of conventional NN model reduction. For this example, the processing of the example 300 occurs on a server or in a cloud environment due to the computational effort required. The example 300 includes an original NN architecture 310, training 320 on dataset D, a $NN_D$ model 330, reduction operations 340 and the resulting reduced $\widehat{NN}_D$ model 350. Given a network architecture NN 310 and a training dataset D, let model $NN_D$ 330 denote the model obtained by training the network architecture NN on D. The goal of model reduction is to construct a new model, where the number of parameters needed to realize the new model is much smaller than that required for realizing $NN_D$, and the desired performance (in terms of training error, testing error, etc.) of the new model is comparable to that of $NN_D$.

Training an NN architecture 310 to generate a model $NN_D$ 330 includes adjusting the network parameters such that the function fits any given finite set of input/output examples. More precisely, a loss function is defined that represents the penalty for mismatching the training data, and the training consists of setting network parameters that yields an acceptably small loss. In the reduction after training on D framework of example 300, the reduction is tied to a particular dataset D, therefore further retraining of the model is not possible on the electronic device 120 (shown as reference 360).

Figure 4:
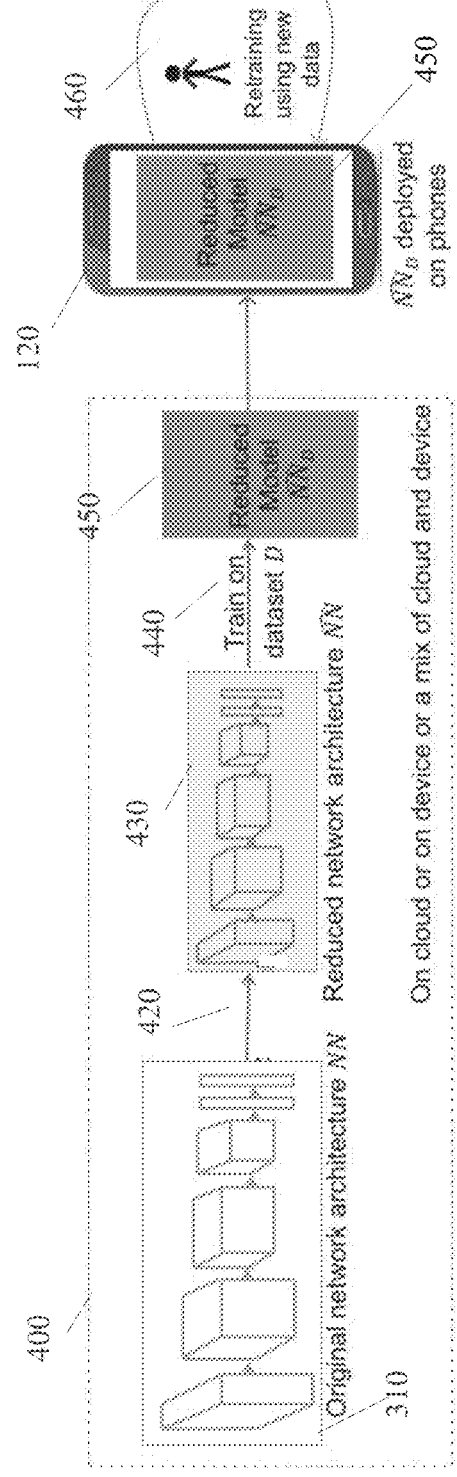
FIG. 4 shows an example of reducing neural network architectures, data set training after reduction and on-device data retraining, according to some embodiments.

FIG. 4 shows a high-level example architecture 400 of reducing neural network architectures, data set training after reduction and on-device data retraining, according to some embodiments. In the "Training after Reduction" framework for model reduction in deep NNs, given an original architecture NN 310, some embodiments first apply a sketching operation (described below) at 420 on the NN 310 that results in a smaller network architecture $\widehat{NN}$ 430, which may be then trained 440 on any dataset. The training 440 of $\widehat{NN}$ on a dataset D to form the reduced model $\widehat{NN}_D$ 450 may take place either on the cloud or server 130 (FIG. 2), the electronic device 120, or a combination of the cloud or server 130 and electronic device 120. In the architecture 400, the reduction before training approach is more amenable to retraining 460 on the electronic device 120, as the reduction is not tied to a particular dataset.

Figure 5:
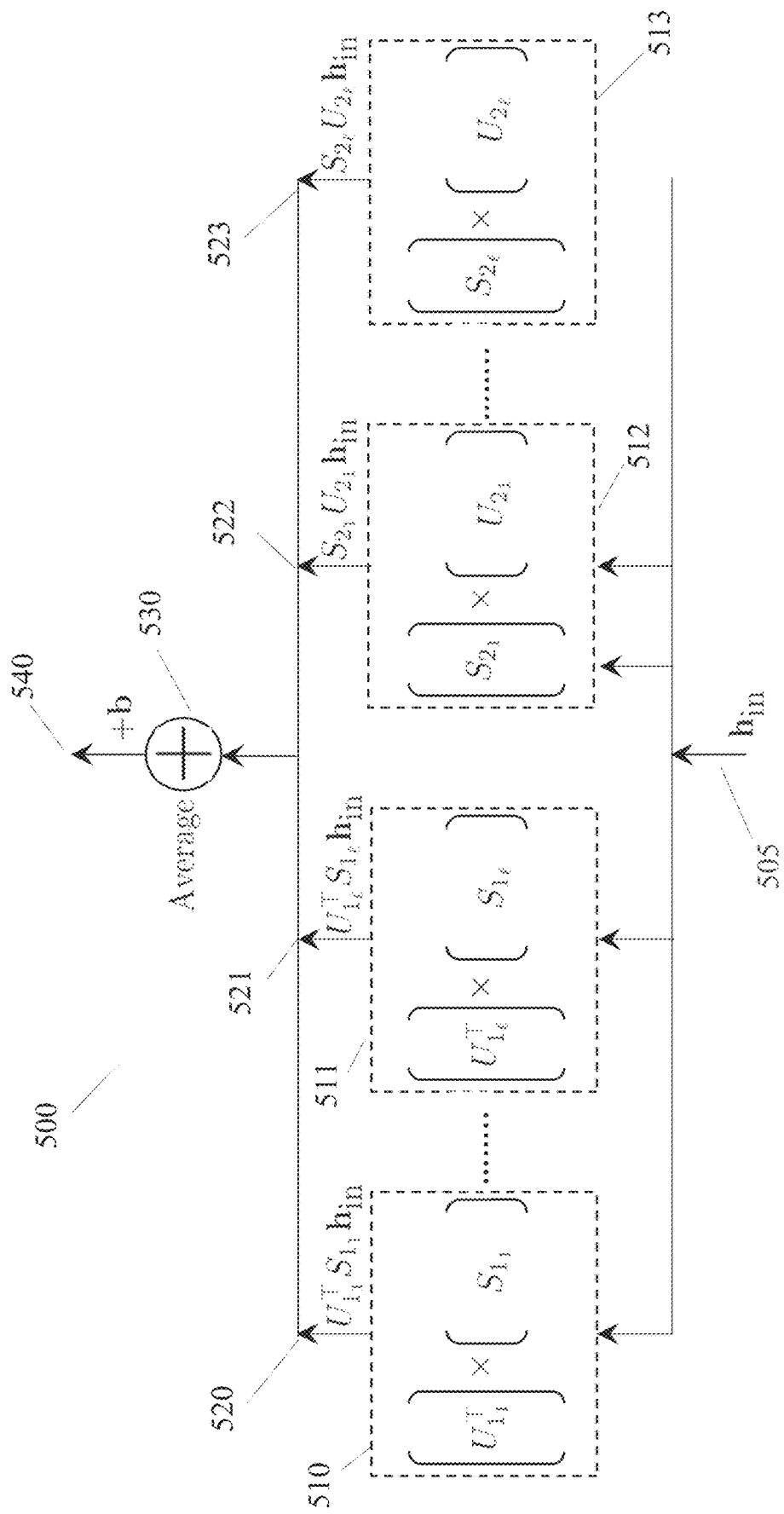
FIG. 5 shows an example of a sketching fully-connected (SK-FC) layer implementing a sketched function $\hat{\phi}(h_{in}; (S_{1_1}, U_{1_1}), \ldots, (S_{1_l}, U_{1_l}), (S_{2_1}, U_{2_1}), \ldots, (S_{2_l}, U_{2_l}), b)$, according to some embodiments.

FIG. 5 shows an exemplary sketching fully-connected (SK-FC) layer 500 implementing a sketched function $\hat{\phi}(h_{in}; (S_{1_1}, U_{1_1}), \ldots, (S_{1_l}, U_{1_l}), (S_{2_1}, U_{2_1}), \ldots, (S_{2_l}, U_{2_l}), b)$, according to some embodiments. One or more embodiments provide for model reduction in a deep NN based on training a reduced network. The reduced network forms an approximation to some original network that is never realized. Here, a network is said to be realized if the parameters of the network are explicitly loaded into the main memory. The system architecture of some embodiments is exemplified in architecture 400 (FIG. 4). Consider a layer L in a NN. Let $\phi(\ )$ denote the function (transformation) applied by this layer. Some embodiments construct an approximation of this function $\phi(\ )$ using a new function $\hat{\phi}(\ )$. This new function $\hat{\phi}(\ )$ defines a new layer that approximates the functionality $\phi(\ )$ of the layer L. Here, approximation means that on any input, the difference between the output produced by $\hat{\phi}(\ )$ and $\phi(\ )$ on that input is bounded. One or more embodiments ensure that $\hat{\phi}(\ )$ and $\phi(\ )$ have the same input and output dimensionality, hence layer L in the network NN may be replaced with this new layer. Repeating the same for all the layers in NN, leads to a reduced network architecture $\widehat{NN}$. An additional feature with this construction is that, based on need, one or more embodiments may select to replace only some of the layers of the NN with their constructed approximations.

For the SK-FC layer 500, let the function $\phi: \Gamma \times \Theta \rightarrow \Omega$, where $\Theta$ represents the parameter space of the function (generally, a tensor space of some order), $\Gamma$ and $\Omega$ represent the input and output space respectively. In some embodiments, the approach is to replace $\phi$ by a randomized function $\hat{\phi}: \Gamma \times \hat{\Theta} \to \Omega$, such that for every $\theta \in \Theta$, there exists a $\hat{\theta} \in \hat{\Theta}$ satisfying the following expectation condition:

$E[\hat{\phi}(\gamma; \hat{\theta})] = \phi(\gamma; \theta)$, for every input $\gamma \in \Gamma$, i.e., $\hat{\phi}(\gamma; \hat{\theta})$ is an unbiased estimator of $\phi(\gamma; \theta)$ Additionally, the construction also ensures that the variance of this estimator is low. In some embodiments, the construction of $\hat{\phi}$ is based on the idea of sketching. Generally, sketching is used to construct a compact representation of the data so that certain properties in the data are (approximately) preserved. The usage of sketching in one or more embodiments, however, is different from the conventional application. Instead of sketching the input data, one or more embodiments apply sketching on the parameters of the function. The idea may be explained, in a simplified way, to construct $\hat{\theta}$, a sketch of $\theta$, through linear projections of $\theta$ with random vectors. In the construction, for a single $\hat{\phi}$, one or more embodiments construct multiple different $\hat{\phi}$'s, by sketching along different dimensions of the tensor space. Combining these $\hat{\phi}$'s together forms a new layer that are added to $\widehat{NN}$ to replicate the functionality of the layer L in the original network NN. Since $\phi$ and $\hat{\phi}$ have the same input and output dimensionality, the layer L in the network NN may be replaced with this new (sketch counterpart) layer. Performing similar replacements for all the parameterized layers in NN leads to the reduced architecture $\widehat{NN}$. The final issue is to train the reduced network $\widehat{NN}$. The parameters (which now represent sketches) of the reduced network may be learned as space efficient on any training set. Compared to the original network, there is also improvement in the training and testing time for the reduced network. Examples of common layers in deep NNs are used to explain how to use the sketching idea of one or more embodiments to construct different $\hat{\phi}$'s for different $\phi$'s.

The SK-FC layer 500 is used for an example of a fully connected layer in a deep NN. Neurons in a fully connected (FC) layer have full connections to all activations in the previous layer. These layers apply a linear transformation of the input. Let $W \in \mathbb{R}^{d_1 \times d_2}$ represent a weight matrix and $b \in \mathbb{R}^{d_1}$ represent a bias vector with $\mathbb{R}^{d_1}$ being a random matrix. Here $d_2$ is the input dimension and $d_1$ is the output dimension of the network layer. The operation of the FC layer on input 505 $h_{in} \in \mathbb{R}^{d_2}$ can be described as: $\phi(h_{in}; W, b) = Wh_{in} + b$. In some embodiments, the FC layer is followed by application of some non-linear activation function (such as a rectified linear unit (ReLU) or a hyperbolic tangent function (tanh)) on the above output 540. All constructions are independent of the applied activation function and further discussion of these functions are omitted herein.

In one or more embodiments, for construction of the sketched function $\hat{\phi}$: the SK-FC layer 500 is parametrized by a bias vector $b \in \mathbb{R}^{d_1}$ and a sequence of matrix pairs 510-511 and 512-513: $(S_{1_1}, U_{1_1}), \ldots, (S_{1_\ell}, U_{1_\ell}), (S_{2_1}, U_{2_1}), \ldots, (S_{2_\ell}, U_{2_\ell})$, where for $i \in \{1, \ldots \ell\}$, $S_{1_i} \in \mathbb{R}^{k \times d_2}$, $S_{2_i} \in \mathbb{R}^{d_1 \times k}$ and $U_{1_i} \in \mathbb{R}^{k \times d_1}$, $U_{2_i} \in \mathbb{R}^{k \times d_2}$ are independent random matrices, which on input 505 $h_{in} \in \mathbb{R}^{d_2}$ performs the following operation:

$$\hat{\phi}(h_{in}; (S_{1_1}, U_{1_1}), \ldots, (S_{1_\ell}, U_{1_\ell}), (S_{2_1}, U_{2_1}), \ldots, (S_{2_\ell}, U_{2_\ell}), b) =$$

$$\frac{1}{2\ell}\sum_{i=1}^{\ell} U_{1_i}^T S_{1_i} h_{in} + \frac{1}{2\ell}$$

$$\sum_{i=1}^{\ell} S_{2_i} U_{2_i} h_{in} + b.$$

Here, l and k, are positive integers.

As shown, the results 520-521 and 522-523 of the operations on the sequence of matrix pairs 510-511 and 512-513 are summed and averaged at 530+b to obtain the output 540.

Figure 6:
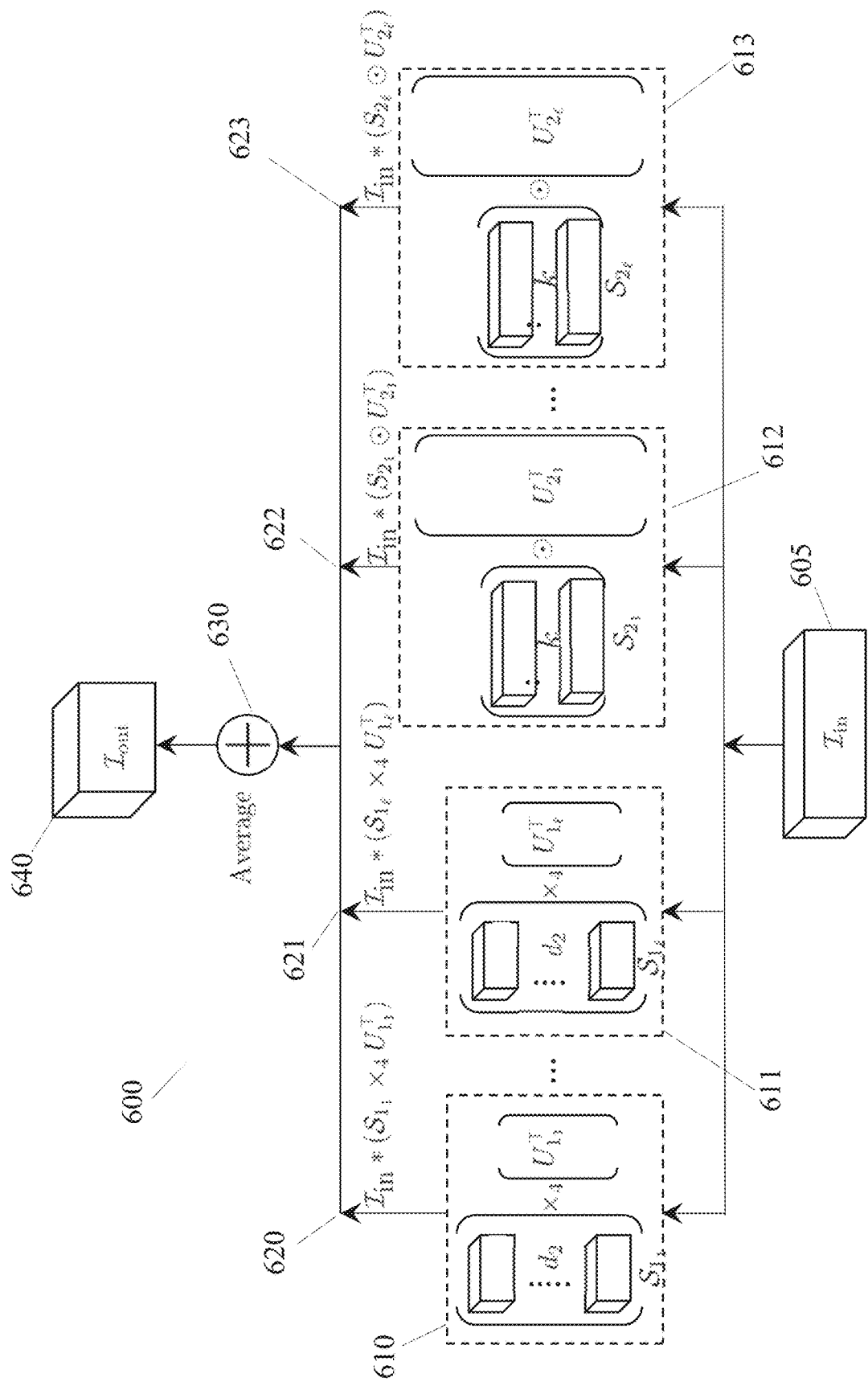
FIG. 6 shows an example SK-converted layer implementing the function $\hat{\phi}(\mathcal{I}_{in}; (\mathcal{S}_{1_1}, U_{1_1}), \ldots, (\mathcal{S}_{1_l}, U_{1_l}), (\mathcal{S}_{2_1}, U_{2_1}), \ldots, (\mathcal{S}_{2_l}, U_{2_l}))$, according to some embodiments.

FIG. 6 shows an example of an SK-converted layer 600 implementing the function $\hat{\phi}(\mathcal{I}_{in}; (\mathcal{S}_{1_1}, U_{1_1}), \ldots, (\mathcal{S}_{1_\ell}, U_{1_\ell}), (\mathcal{S}_{2_1}, U_{2_1}), \ldots, (\mathcal{S}_{2_\ell}, U_{2_\ell}))$, according to some embodiments. A typical convolutional layer in a convolutional NN (CNN) transforms a 3-dimensional input tensor $\mathcal{I}_{in} \in \mathbb{R}^{h_1 \times w_1 \times d_2}$ into a output tensor $\mathcal{I}_{out} \in \mathbb{R}^{h_2 \times w_2 \times d_1}$ by convolving $\mathcal{I}_{in}$ with the kernel tensor $\mathcal{K} \in \mathbb{R}^{d_2 \times h \times w \times d_1}$ where $h_2$ and $w_2$ depends on h, w, $h_1$, $w_1$ and possibly other parameters such as stride, spatial extent, zero-padding, etc. Herein, * is used to denote the convolution operation, $\mathcal{I}_{out} = \mathcal{I}_{in} * \mathcal{K}$, where $\mathcal{I}_{in}$ is the input 605 and $\mathcal{I}_{out}$ is the output 640. In this example, either the dimensionality of the input feature map ($d_2$) or the output feature map ($d_1$) in the kernel tensor $\mathcal{K}$ are reduced.

In some embodiments, for the construction of the sketched function $\hat{\phi}$: the SK-converted layer 600 is parametrized by a sequence of tensor-matrix pairs 610-611 and 612-613: $(\mathcal{S}_{1_1}, U_{1_1}), \ldots, (\mathcal{S}_{1_\ell}, U_{1_\ell}), (\mathcal{S}_{2_1}, U_{2_1}), \ldots, (\mathcal{S}_{2_\ell}, U_{2_\ell})$ where for $i \in \{1, \ldots \ell\}$, $\mathcal{S}_{1_i} \in \mathbb{R}^{d_2 \times h \times w \times k}$, $\mathcal{S}_{2_i} \in \mathbb{R}^{k \times h \times w \times d_1}$ and $U_{1_i} \in \mathbb{R}^{k \times d_1}$, $U_{2_i} \in \mathbb{R}^{k \times d_2}$ are independent random matrices, which $U_{2_i}$ on input 605 $\mathcal{I}_{in} \in \mathbb{R}^{h_1 \times w_1 \times d_2}$ performs the following operation:

$$\hat{\phi}(\mathcal{I}_{in}; (S_{1_1}, U_{1_1}), \ldots, (S_{1_\ell}, U_{1_\ell}), (S_{2_1}, U_{2_1}), \ldots, (S_{2_\ell}, U_{2_\ell})) =$$

$$\frac{1}{2\ell}\sum_{i=1}^{\ell} \mathcal{I}_{in} * (S_{1_i} \times_4 U_{1_i}^T) + \frac{1}{2\ell}$$

$$\sum_{i=1}^{\ell} \mathcal{I}_{in} * (S_{2_i} \odot U_{2_i}^T)$$

where $x_n$ represents nth-mode tensor multiplication, and the (x, y, z, s)th element of the tensor $(\mathcal{S}_{2_i} \odot U_{2_i}^T)$ is defined as $$\sum_{c=1}^{k}\sum_{i=1}^{h}\sum_{j=1}^{w} \mathcal{S}_{2_{i_{cijs}}} U_{2_{i_{(cij)(xyz)}}}.$$

As shown, the results 620-621 and 622-623 of the operations on the sequence of matrix pairs 610-611 and 612-613 are summed and averaged at 630 to obtain the output 640.

Figure 7:
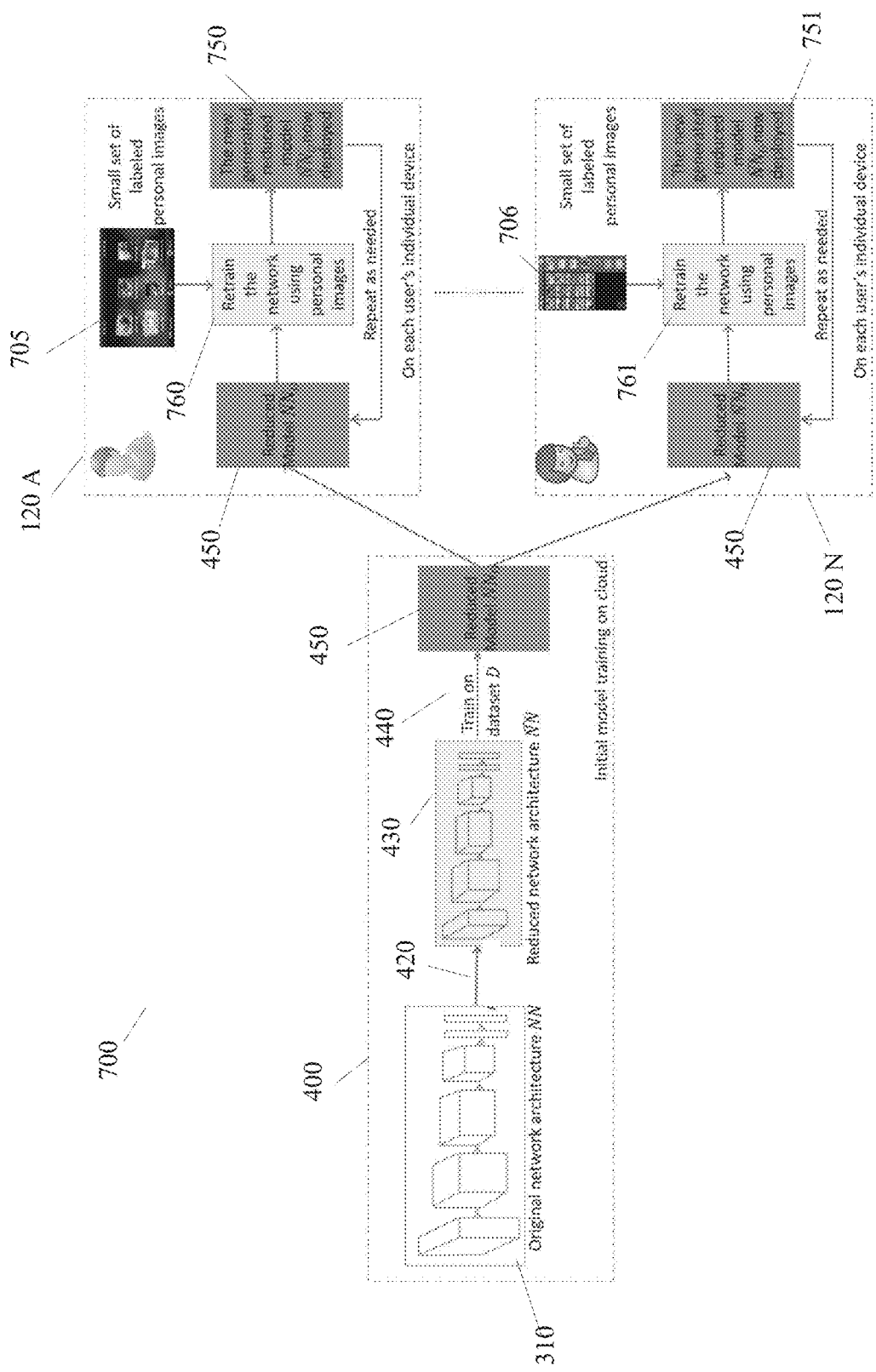
FIG. 7 shows an example of enabling personalized image tagging and search through deep neural network models generated using neural network architecture reduction, according to some embodiments.

FIG. 7 shows an example 700 of enabling personalized image tagging and search through deep NN models, generated using NN architecture reduction, according to some embodiments. Example 700 demonstrates some of the practical benefits of one or more embodiments. In the example 700, the use-case of enhancing a photograph/video gallery experience by providing personalized tagging (of objects/people/location, etc.) and searching on images is presented. One advantage of the "Training after Reduction" framework as compared to conventional "Reduction after Training" frameworks is that the former allows a reduced model to be retrained on a mobile electronic device (e.g., an electronic device 120). This provides a clean way of personalizing deep learning models for each user.

In some embodiments, the architecture 400 of a CNN that is good for general object detection in images. This architecture 400 is reduced to construct a new architecture $\widehat{NN}$ 430. The reduced architecture $\widehat{NN}$ 430 is then trained 440 on a large public (and/or private) image dataset D on the cloud or server 130 (FIG. 1), which generates a reduced model $\widehat{NN}_D$ 450.

In one or more embodiments, the reduced model $\widehat{NN}_D$ 450 is deployed on the electronic devices 120 A (at 750) through 120 N (at 751), N being a positive integer. The reduced model $\widehat{NN}_D$ 450 interacts with the gallery applications or personal images 705 (for electronic device 120 A) and 706 (for electronic device 120 N) to perform object detection. The reduced model $\widehat{NN}_D$ 450 may be retrained (at 760 and 761) using a small set of labeled images that a user provides for personalization. For example, if the initial reduced model $\widehat{NN}_D$ 450 recognizes human faces, then a user can personalize this reduced model $\widehat{NN}_D$ 450 to not just identify human faces, but also tag them appropriately based on user provided tags. Here, tags could represent names, personal relationships (such as friends, family, spouse, parents, children etc.), or other similar attributes. Some of the features of this personalization are:

1) It is computationally feasible to retrain the reduced model $\widehat{NN}_D$ 450 entirely on the electronic device A/electronic device B as the resulting model is lightweight in terms of its computational requirements;
2) The retraining generally requires a small set of labeled images. For example, about 10-20 images are needed for successfully tagging faces in images;
3) No need for Internet/wireless connectivity, as the entire retraining process (760 and 761) happens on each electronic device (e.g., electronic device 120 A through electronic device 120 N), without any communication to the cloud or server 130 (FIG. 1);
4) Privacy-protection: private images never leave the electronic devices 120 A through 120 N.

FIG. 8 shows a block diagram of a process 800 for reducing neural network architectures, according to some embodiments. In block 810, process 800 provides deploying an NN model (e.g., NN model 450, FIGS. 4, 7) on an electronic device (e.g., electronic device 120, FIGS. 2, 4). The NN model is generated by training a first NN architecture (e.g., NN architecture 310, FIG. 4) on a first dataset (e.g., a large public and/or private dataset (e.g., D 440, FIGS. 4, 7). A first function defines a first layer of the first NN architecture, the first function is constructed based on approximating a second function applied by a second layer of a second NN architecture. In some embodiments, approximating is based on a sketching operation (e.g., using the SK-FC layer 500, FIG. 5, SK-converted layer 600, FIG. 6) on parameters of a function applied by such layers for generating the first function defining the first layer of the first NN architecture.

In some embodiments, the sketching operation may be performed along different dimensions of a tensor space for generating multiple different first functions that are combined to form the first layer. In block 820, process 800 provides enabling retraining of the NN model on the electronic device using a second data set. In some embodiments, the first dataset may include a "global" dataset (e.g., a large public and/or private dataset (e.g., D 440, FIGS. 4, 7) In block 830, process 800 provides for retraining the NN model on the electronic device using a personalized data set (e.g., photo galleries or personal images 705, 706, etc.).

In some embodiments, process 800 provides that the first NN architecture is computationally reduced from the second NN architecture. The retraining of the first NN architecture is not tied to a particular dataset.

Figure 9:
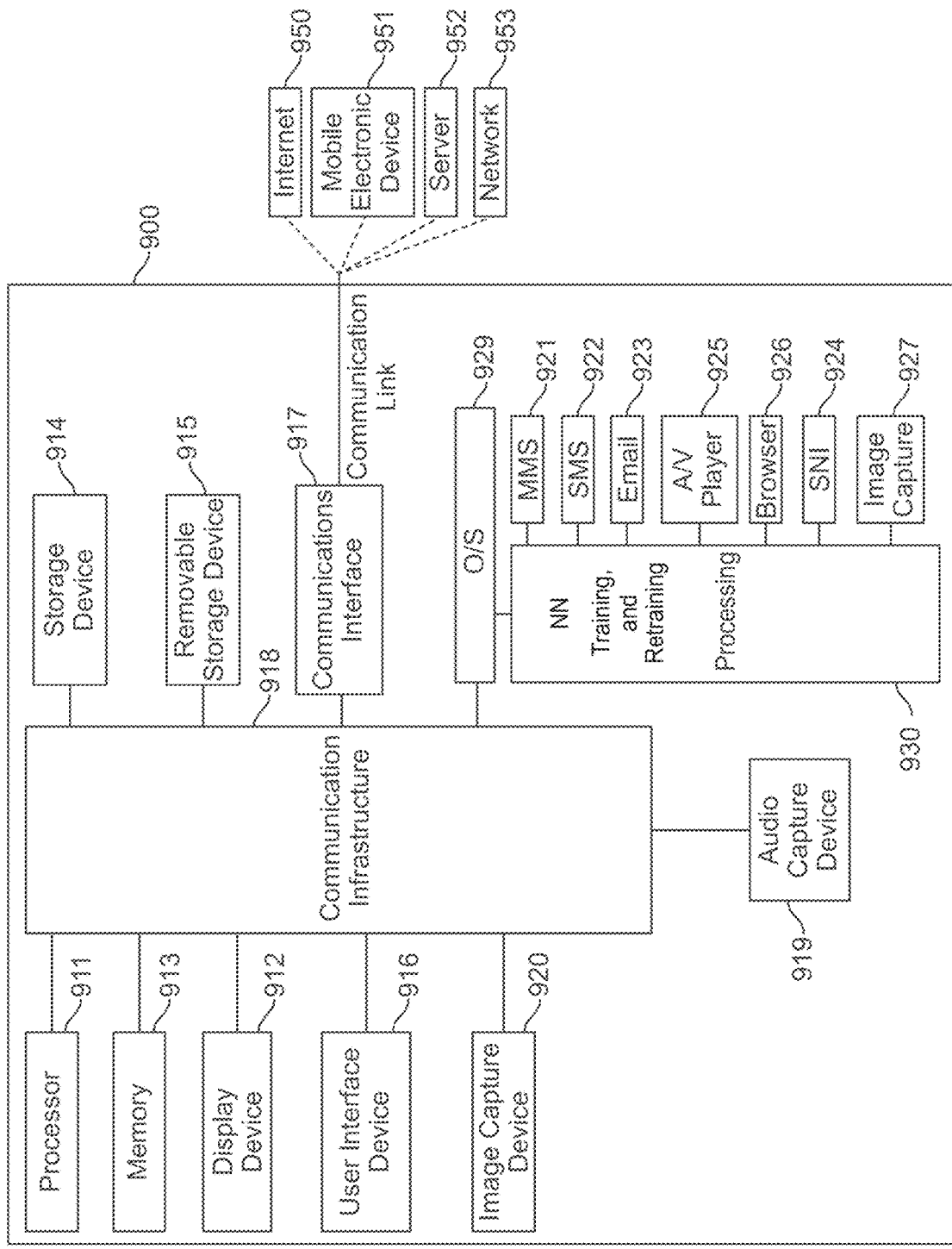
FIG. 9 is a high-level block diagram showing an information processing system comprising a computing system implementing one or more embodiments.

FIG. 9 is an exemplary high-level block diagram showing an information processing system comprising a computing system implementing one or more embodiments. The system 900 includes one or more processors 911 (e.g., ASIC, CPU, etc.), and may further include an electronic display device 912 (for displaying graphics, text, and other data), a main memory 913 (e.g., random access memory (RAM), cache devices, etc.), storage device 914 (e.g., hard disk drive), removable storage device 915 (e.g., removable storage drive, removable memory, a magnetic tape drive, optical disk drive, computer-readable medium having stored therein computer software and/or data), user interface device 916 (e.g., keyboard, touch screen, keypad, pointing device), and a communication interface 917 (e.g., modem, wireless transceiver (such as Wi-Fi, Cellular), a network interface (such as an Ethernet card), a communications port, or a PCMCIA slot and card).

The communication interface 917 allows software and data to be transferred between the computer system and external devices through the Internet 950, mobile electronic device 951, a server 952, a network 953, etc. The system 900 further includes a communications infrastructure 918 (e.g., a communications bus, cross bar, or network) to which the aforementioned devices 911 through 917 are connected.

The information transferred via communications interface 917 may be in the form of signals such as electronic, electromagnetic, optical, or other signals capable of being received by communications interface 917, via a communication link that carries signals and may be implemented using wire or cable, fiber optics, a phone line, a cellular phone link, a radio frequency (RF) link, and/or other communication channels.

In one implementation of one or more embodiments in a mobile wireless device (e.g., a mobile phone, tablet, wearable device, etc.), the system 900 further includes an image capture device 920, such as a camera 128 (FIG. 2), and an audio capture device 919, such as a microphone 122 (FIG. 2). The system 900 may further include application processing or processors as MMS 921, SMS 922, email 923, social network interface (SNI) 924, audio/video (AV) player 925, web browser 926, image capture 927, etc.

In one embodiment, the system 900 includes NN reduction, training and retraining processing 930 that may implement processing similar as described regarding NN, training and retraining app 129 (FIG. 2), processing for the SK-FC layer 500 (FIG. 5), processing for SK-converted layer 600 (FIG. 6), and process 800 (FIG. 8) as described above. In one embodiment, the NN reduction, training and retraining processing 930 along with an operating system 929 may be implemented as executable code residing in a memory of the system 900. In another embodiment, the intelligent agent processing 930 may be provided in hardware, firmware, etc.

In one embodiment, the main memory 913, storage device 914 and removable storage device 915, each by themselves or in any combination, may store instructions for the embodiments described above that may be executed by the one or more processors 911.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
deploying a neural network (NN) model on an electronic device, the NN model being generated by training a first NN architecture on a first dataset, wherein a first function defines a first layer of the first NN architecture, the first function being constructed based on approximating a second function applied by a second layer of a second NN architecture, the approximating based on a sketching operation performed on network function parameters of the second function through linear projections of the second function with random vectors, a number of network function parameters for the first function is less than a number of network function parameters for the second function for parameter reduction, and the network function parameters for the second function are reduced without having to train the second NN architecture prior to the training of the first NN architecture; and
enabling retraining of the NN model on the electronic device using a second data set, wherein the first layer of the first NN architecture replaces the second layer of the second NN architecture, the first function and the second function have a same input and output dimensionality, and retraining of the NN model that is reduced in size provides a personalized deep learning model for a user of the electronic device.

2. The method of claim 1, wherein prior knowledge of the first dataset is not required due to the training occurring after the parameter reduction such that the parameter reduction is not tied to the first dataset, and the first layer is a sketching converted layer that is parameterized by a sequence of tensor-matrix pairs.

3. The method of claim 1, wherein the sketching operation is performed along different dimensions of a tensor space for generating multiple different first functions that are combined to form the first layer and that replicate functionality of the second layer.

4. The method of claim 1, wherein the second dataset is a personal data set on the electronic device, the first NN architecture is trained on the first dataset after the second NN architecture is reduced to the first NN architecture, and the sketching operation is not performed on input data of the second function.

5. The method of claim 4, wherein the first NN architecture is computationally reduced from the second NN architecture.

6. The method of claim 1, wherein retraining of the first NN architecture is not tied to a particular dataset.

7. The method of claim 1, wherein the training of the first NN architecture is performed on a server or a cloud environment, the electronic device comprises a mobile electronic device, and the parameter reduction results in reduction in computing resources required for processing the NN model by the mobile electronic device including computation time, storage space and transmission bandwidth.

8. An electronic device comprising:
a memory storing instructions; and
at least one processor executing the instructions including a process configured to:

deploy a neural network (NN) model on the electronic device, the NN model being generated by training a first NN architecture on a first dataset, wherein a first function defines a first layer of the first NN architecture, the first function being constructed based on approximating a second function applied by a second layer of a second NN architecture, the approximating based on a sketching operation performed on network function parameters of the second function through linear projections of the second function with random vectors, a number of network function parameters for the first function is less than a number of network function parameters for the second function for parameter reduction, and the network function parameters for the second function are reduced without having to train the second NN architecture prior to the training of the first NN architecture; and enable retraining of the NN model on the electronic device using a second data set, wherein the first layer of the first NN architecture replaces the second layer of the second NN architecture, the first function and the second function have a same input and output dimensionality, and retraining of the NN model that is reduced in size provides a personalized deep learning model for a user of the electronic device.

9. The electronic device of claim 8, wherein prior knowledge of the first dataset is not required due to the training occurring after the parameter reduction such that the parameter reduction is not tied to the first dataset, and the first layer is a sketching fully-connected layer that is parameterized by a bias vector and a sequence of matrix pairs.

10. The electronic device of claim 8, wherein the sketching operation is performed along different dimensions of a tensor space for generating multiple different first functions that are combined to form the first layer and that replicate functionality of the second layer.

11. The electronic device of claim 8, wherein the second dataset is a personal data set on the electronic device, the first NN architecture is trained on the first dataset after the second NN architecture is reduced to the first NN architecture, and the sketching operation is not performed on input data of the second function.

12. The electronic device of claim 11, wherein the first NN architecture is computationally reduced from the second NN architecture.

13. The electronic device of claim 9, wherein retraining of the first NN architecture is not tied to a particular dataset.

14. The electronic device of claim 9, wherein the training of the first NN architecture is performed on a server or a cloud environment, the electronic device comprises a mobile electronic device, and the parameter reduction results in reduction in computing resources required for processing the NN model by the mobile electronic device including computation time, storage space and transmission bandwidth.

15. A non-transitory processor-readable medium that includes a program that when executed by a processor performing a method comprising:

deploying a neural network (NN) model on an electronic device, the NN model being generated by training a first NN architecture on a first dataset, wherein a first function defines a first layer of the first NN architecture, the first function being constructed based on approximating a second function applied by a second layer of a second NN architecture, the approximating based on a sketching operation performed on network function parameters of the second function through linear projections of the second function with random vectors, a number of network function parameters for the first function is less than a number of network function parameters for the second function for parameter reduction, and the network function parameters for the second function are reduced without having to train the second NN architecture prior to the training of the first NN architecture; and enabling retraining of the NN model on the electronic device using a second data set, wherein the first layer of the first NN architecture replaces the second layer of the second NN architecture, the first function and the second function have a same input and output dimensionality, and retraining of the NN model that is reduced in size provides a personalized deep learning model for a user of the electronic device.

16. The non-transitory processor-readable medium of claim 15, wherein:

prior knowledge of the first dataset is not required due to the training occurring after the parameter reduction such that the parameter reduction is not tied to the first dataset; and the first layer is a sketching fully-connected layer that is parameterized by a bias vector and a sequence of matrix pairs.

17. The non-transitory processor-readable medium of claim 15, wherein the second dataset is a personal data set on the electronic device, the first NN architecture is trained on the first dataset after the second NN architecture is reduced to the first NN architecture, the sketching operation is performed along different dimensions of a tensor space for generating multiple different first functions that are combined to form the first layer and that replicate functionality of the second layer.

18. The non-transitory processor-readable medium of claim 17, wherein the first NN architecture is computationally reduced from the second NN architecture, and the sketching operation is not performed on input data of the second function.

19. The non-transitory processor-readable medium of claim 18, wherein retraining of the first NN architecture is not tied to a particular dataset.

20. The non-transitory processor-readable medium of claim 15, wherein the training of the first NN architecture is performed on a server or a cloud environment, the electronic device comprises a mobile electronic device, and the parameter reduction results in reduction in computing resources required for processing the NN model by the mobile electronic device including computation time, storage space and transmission bandwidth.

* * * * *